United States Patent
Cheon

(10) Patent No.: US 10,834,435 B2
(45) Date of Patent: Nov. 10, 2020

(54) DISPLAY APPARATUS AND CONTENT DISPLAY METHOD THEREOF

(71) Applicant: SAMSUNG ELECTRONICS CO., LTD., Suwon-si (KR)

(72) Inventor: Jeong-sik Cheon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/679,477

(22) Filed: Aug. 17, 2017

(65) Prior Publication Data
US 2018/0054638 A1 Feb. 22, 2018

(30) Foreign Application Priority Data
Aug. 18, 2016 (KR) .................. 10-2016-0104678

(51) Int. Cl.
*H04N 21/2387* (2011.01)
*H04N 21/234* (2011.01)
(Continued)

(52) U.S. Cl.
CPC ..... *H04N 21/23406* (2013.01); *H04L 65/604* (2013.01); *H04L 67/325* (2013.01);
(Continued)

(58) Field of Classification Search
CPC ......... H04N 21/23406; H04N 21/2387; H04N 21/44004; H04N 21/47217; H04L 65/00
(Continued)

(56) References Cited

U.S. PATENT DOCUMENTS 7,558,806 B2 *  7/2009  Bobrovskiy ....... H04N 21/4332
7,567,748 B1     7/2009  Yoo et al.
(Continued)

FOREIGN PATENT DOCUMENTS

EP  1 274 086  1/2003
EP  1 278 193  1/2003
(Continued)

OTHER PUBLICATIONS

Search Report and Written Opinion dated Nov. 30, 2017 in counterpart International Patent Application No. PCT/KR2017/009010.

*Primary Examiner* — Nnenna N Ekpo
(74) *Attorney, Agent, or Firm* — Nixon & Vanderhye P.C.

(57) ABSTRACT

A display apparatus is provided. The display apparatus includes: a display configured to display a content; a buffer configured to store data corresponding to a predetermined reproduction section of the content with reference to a current reproduction time of the content; and a processor configured to, in response to a command to display a specific reproduction time of the content being received, determine a reproduction position of the content corresponding the specific reproduction time based on a position corresponding to the predetermined reproduction section based on a position relationship between the specific reproduction time and the current reproduction time, or to determine the reproduction position of the content corresponding to the specific reproduction time based on at least one of a start position and an end position of the content.

17 Claims, 11 Drawing Sheets

(51) Int. Cl.
*H04L 29/06* (2006.01)
*H04L 29/08* (2006.01)
*H04N 21/433* (2011.01)
*H04N 21/44* (2011.01)
*H04N 21/472* (2011.01)

(52) U.S. Cl.
CPC ..... *H04N 21/2387* (2013.01); *H04N 21/4333* (2013.01); *H04N 21/44004* (2013.01); *H04N 21/47217* (2013.01)

(58) Field of Classification Search
USPC .......................................................... 725/94
See application file for complete search history.

(56) References Cited

U.S. PATENT DOCUMENTS

| | | | |
|---|---|---|---|
| 7,702,805 B1 * | 4/2010 | Kapoor | H04N 7/17336 709/231 |
| 8,090,458 B2 | 1/2012 | Kim | |
| 8,611,721 B2 | 12/2013 | Song | |
| 8,705,946 B2 * | 4/2014 | Takashima | H04N 13/0055 348/42 |
| 2002/0010926 A1 * | 1/2002 | Lee | H04N 5/44513 725/40 |
| 2002/0122357 A1 | 9/2002 | Negishi | |
| 2005/0147383 A1 | 7/2005 | Ihara | |
| 2008/0276173 A1 * | 11/2008 | Li | G11B 27/105 715/716 |
| 2009/0089846 A1 * | 4/2009 | Wang | H04N 7/17318 725/98 |
| 2013/0051758 A1 * | 2/2013 | Kummer | H04N 5/76 386/241 |
| 2013/0084054 A1 | 4/2013 | Ohashi | |
| 2013/0297308 A1 * | 11/2013 | Koo | G06F 3/167 704/235 |
| 2015/0121224 A1 | 4/2015 | Krasnahill, Jr. | |
| 2015/0288993 A1 * | 10/2015 | Cho | H04N 21/2353 725/116 |
| 2016/0370956 A1 * | 12/2016 | Penha | G11B 27/005 |
| 2017/0336955 A1 * | 11/2017 | Cho | H04N 21/4402 |

FOREIGN PATENT DOCUMENTS

| | | |
|---|---|---|
| EP | 0 786 909 | 11/2006 |
| EP | 2 439 741 | 4/2012 |
| JP | 2009-278672 | 11/2009 |
| KR | 10-0639110 | 10/2006 |
| KR | 10-1251312 | 4/2013 |
| KR | 10-1362576 | 2/2014 |

* cited by examiner

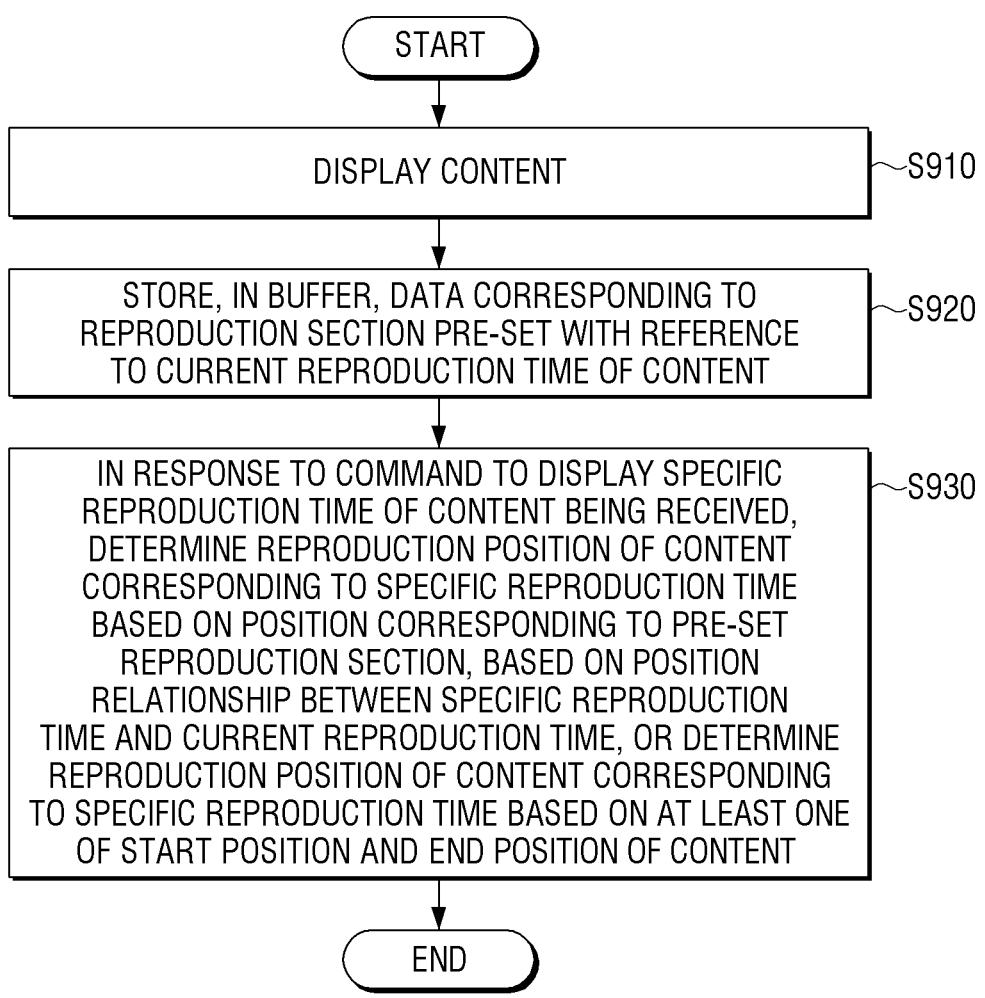

DISPLAY APPARATUS AND CONTENT DISPLAY METHOD THEREOF

CROSS-REFERENCE TO RELATED APPLICATION

This application is based on and claims priority under 35 U.S.C. § 119 to Korean Patent Application No. 10-2016-0104678, filed on Aug. 18, 2016, in the Korean Intellectual Property Office, the disclosure of which is incorporated by reference herein in its entirety.

BACKGROUND

Field

The present disclosure relates generally to a display apparatus and a content display method thereof, and for example, to a display apparatus which displays a specific reproduction time of a content, and a content display method thereof.

Description of Related Art

A stream and a content including index information may swiftly determine position information which is closest to a specific reproduction time that a user wishes to display, using the index information. However, there is a problem that, when an error occurs in a header storing index information or index information stored in a header is insufficient, position information corresponding to a specific reproduction time may not be determined.

Since a stream and a content which do not include index information cannot use index information, other methods may be used to determine position information closest to a specific reproduction time that a user wishes to display. From among related-art methods, a binary search method and a complete search method focus on accuracy, and a linear search method focuses on enhancement of a search speed.

However, in the related-art methods, if accuracy is high, a search speed is low, and if a search speed is high, accuracy is low. Therefore, there is a demand for a technology which can achieve both accuracy and a search speed at an appropriate level and which can be applied to a stream and a content including index information.

SUMMARY

One or more example embodiments address the above disadvantages and other disadvantages not described above.

One or more example embodiments provide a display apparatus which determines a reproduction position of a content corresponding to a specific reproduction time based on a position relationship between the specific reproduction time of the content and a current reproduction time, and a content display method thereof.

According to an aspect of an example embodiment, a display apparatus is provided including: a display configured to display a content; a buffer configured to store data corresponding to a predetermined reproduction section with reference to a current reproduction time of the content; and a processor configured to, in response to a command to display a specific reproduction time of the content being received, determine a reproduction position of the content corresponding the specific reproduction time based on a position corresponding to the predetermined reproduction section based on a position relationship between the specific reproduction time and the current reproduction time, or to determine the reproduction position of the content corresponding to the specific reproduction time based on at least one of a start position and an end position of the content.

The processor may be configured to: determine the reproduction position of the content corresponding to the specific reproduction time based on a time variation which is calculated (determined) based on time information corresponding to a start position and an end position of the predetermined reproduction section, and a position variation which is calculated (determined) based on position information corresponding to the start position and the end position of the predetermined reproduction section; or determine the reproduction position of the content corresponding to the specific reproduction time based on a time variation which is calculated (determined) based on time information corresponding to one of the start position and the end position of the content and the current reproduction time, and a position variation which is calculated (determined) based on position information corresponding to one of the start position and the end position of the content and the current reproduction time.

In response to a position difference between a reproduction position corresponding to the specific reproduction time and a reproduction position corresponding to the current reproduction time being less than or equal to a predetermined value, the processor may be configured to determine the reproduction position of the content corresponding to the specific reproduction time based on a start position and an end position of the predetermined reproduction section, and, in response to the position difference exceeding the predetermined value, the processor may be configured to determine the reproduction position of the content corresponding to the specific reproduction time based on at least one of the start position and the end position of the content.

The processor may be configured to determine a size of the predetermined value based on a size of the buffer.

In response to the content being a streaming content and the position difference exceeding the predetermined value, the processor may be configured to determine the reproduction position of the content corresponding to the specific reproduction time based on the start position of the content and the current reproduction time.

In response to the content being a pre-stored content and the position difference exceeding the predetermined value, and, in response to the specific reproduction time being before the current reproduction time, the processor may be configured to determine the reproduction position of the content corresponding to the specific reproduction time based on the start position of the content and the current reproduction time, and, in response to the specific reproduction time being after the current reproduction time, the processor may be configured to determine the reproduction position of the content corresponding to the specific reproduction time based on the end position of the content and the current reproduction time.

In response to the position difference being less than or equal to the predetermined value, the processor may be configured to determine the reproduction position of the content corresponding to the specific reproduction time based on a time variation which is calculated (determined) based on time stamps corresponding to the start position and the end position of the predetermined reproduction section, and a position variation which is calculated (determined)

based on reproduction positions corresponding to the start position and the end position of the predetermined reproduction section.

In response to the position difference exceeding the predetermined value, the processor may be configured to determine the reproduction position of the content corresponding to the specific reproduction time based on a time variation which is calculated (determined) based on time stamps corresponding to the start position of the content and the current reproduction time, and a position variation which is calculated (determined) based on reproduction positions corresponding to the start position of the content and the current reproduction time.

In response to the content being a pre-stored 3D content, the processor may be configured to determine the reproduction position of the content corresponding to the specific reproduction time based on the start position and the end position of the content.

According to an aspect of another example embodiment, a content display method of a display apparatus is provided, the method including: displaying a content; storing, in a buffer, data corresponding to a predetermined reproduction section with reference to a current reproduction time of the content; and in response to a command to display a specific reproduction time of the content being received, determining a reproduction position of the content corresponding the specific reproduction time based on a position corresponding to the predetermined reproduction section based on a position relationship between the specific reproduction time and the current reproduction time, or determining the reproduction position of the content corresponding to the specific reproduction time based on at least one of a start position and an end position of the content.

The determining may include: determining the reproduction position of the content corresponding to the specific reproduction time based on a time variation which is calculated based on time information corresponding to a start position and an end position of the predetermined reproduction section, and a position variation which is calculated based on position information corresponding to the start position and the end position of the predetermined reproduction section; or determining the reproduction position of the content corresponding to the specific reproduction time based on a time variation which is calculated based on time information corresponding to one of the start position and the end position of the content and the current reproduction time, and a position variation which is calculated based on position information corresponding to one of the start position and the end position of the content and the current reproduction time.

The determining may include: in response to a position difference between a reproduction position corresponding to the specific reproduction time and a reproduction position corresponding to the current reproduction time being less than or equal to a predetermined value, determining the reproduction position of the content corresponding to the specific reproduction time based on a start position and an end position of the predetermined reproduction section, and, in response to the position difference exceeding the predetermined value, determining the reproduction position of the content corresponding to the specific reproduction time based on at least one of the start position and the end position of the content.

A size of the predetermined value may be determined based on a size of the buffer.

The determining may include: in response to the content being a streaming content and the position difference exceeding the predetermined value, determining the reproduction position of the content corresponding to the specific reproduction time based on the start position of the content and the current reproduction time.

The determining may include: in response to the content being a pre-stored content and the position difference exceeding the predetermined value, and, in response to the specific reproduction time being before the current reproduction time, determining the reproduction position of the content corresponding to the specific reproduction time based on the start position of the content and the current reproduction time, and, in response to the specific reproduction time being after the current reproduction time, determining the reproduction position of the content corresponding to the specific reproduction time based on the end position of the content and the current reproduction time.

The determining may include: in response to the position difference being less than or equal to the predetermined value, determining the reproduction position of the content corresponding to the specific reproduction time based on a time variation which is calculated based on time stamps corresponding to the start position and the end position of the predetermined reproduction section, and a position variation which is calculated based on reproduction positions corresponding to the start position and the end position of the predetermined reproduction section.

The determining may include: in response to the position difference exceeding the predetermined value, determining the reproduction position of the content corresponding to the specific reproduction time based on a time variation which is calculated based on time stamps corresponding to the start position of the content and the current reproduction time, and a position variation which is calculated based on reproduction positions corresponding to the start position of the content and the current reproduction time.

The determining may include: in response to the content being a pre-stored 3D content, determining the reproduction position of the content corresponding to the specific reproduction time based on the start position and the end position of the content.

According to an aspect of another example embodiment, a non-transitory computer readable recording medium which stores a program for performing a content display method of a display apparatus is provided, the content display method including: displaying a content; storing data corresponding to a predetermined reproduction section with reference to a current reproduction time of the content; and, in response to a command to display a specific reproduction time of the content being received, determining a reproduction position of the content corresponding the specific reproduction time based on a position corresponding to the predetermined reproduction section based on a position relationship between the specific reproduction time and the current reproduction time, or determining the reproduction position of the content corresponding to the specific reproduction time based on at least one of a start position and an end position of the content.

According to various example embodiments described above, the display apparatus may determine a reproduction position of a content corresponding to a specific reproduction time based on a position relationship between the specific reproduction time and a current reproduction time of the content. Accordingly, the display apparatus may determine a reproduction position desired by the user more swiftly and more precisely.

Additional and/or other aspects and advantages of the disclosure will be set forth in part in the description which follows and, in part, will be apparent from the description.

BRIEF DESCRIPTION OF THE DRAWINGS

The above and/or other aspects, features and attendant advantages of the present disclosure will be more apparent and readily appreciated from the following detailed description, taken in conjunction with the accompanying drawings, in which like reference numerals refer to like elements, and wherein:

FIG. 9 is a flowchart illustrating an example display method of a display apparatus according to an example embodiment.

DETAILED DESCRIPTION

Figure 1A:
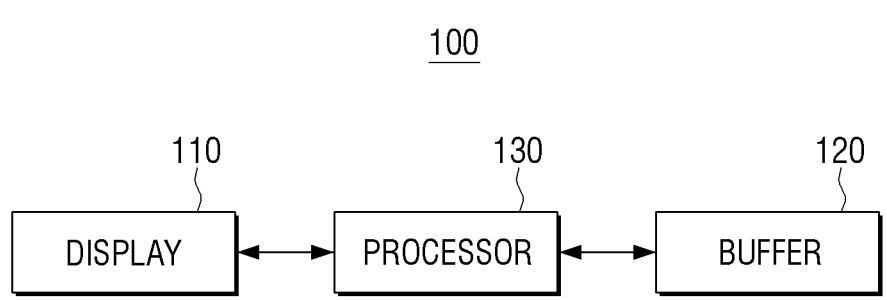
FIG. 1A is a diagram illustrating an example display apparatus according to an example embodiment.

Various example embodiments of the present disclosure will be described in greater below with reference to the accompanying drawings. However, various example embodiments of the present disclosure are not limited to the specific embodiments and should be understood as including modifications, equivalents and/or alternatives of example embodiments of the present disclosure. In the explanation of the drawings, similar reference numerals are used for similar elements.

It will be understood that when an element (for example, a first element) is "(operatively or communicatively) coupled with/to" or "connected to" another element (for example, a second element), the element may be directly coupled with/to another element, and there may be an intervening element (for example, a third element) between the element and another element. On the other hand, it will be understood that when an element (for example, a first element) is "directly coupled with/to" or "directly connected to" another element (for example, a second element), there is no intervening element (for example, a third element) between the element and another element.

The terms used in various example embodiments of the present disclosure are merely for the purpose of describing particular example embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various example embodiments. According to the situation, even if the terms are defined in the example embodiments, they should not be interpreted as excluding the embodiments of the present disclosure.

Hereinafter, various example embodiments will be described in greater detail with reference to the accompanying drawings.

FIG. 1A is a diagram illustrating an example display apparatus 100 according to an example embodiment of the present disclosure. Referring to FIG. 1A, the display apparatus 100 may include a display 110, a buffer 120, and a processor (e.g., including processing circuitry) 130.

The display apparatus 100 may be implemented using various types of devices provided with a display function. For example, and without limitation, the display apparatus 100 may be a stationary device such as a monitor, a TV, a kiosk, or the like. Alternatively, the display apparatus 100 may be a portable device such as a mobile phone, a tablet personal computer (PC), a digital camera, a camcorder, a notebook PC, a personal digital assistant (PDA), or the like, but is not limited thereto.

The display 110 may display a content under the control of the processor 130. The display 110 may display a streaming content or a pre-stored content.

In addition, the display 110 may be implemented by using a liquid crystal display (LCD) panel, an organic light emitting diode (OLED), or the like, but this should not be considered as limiting. In addition, the display 110 may be implemented by using a flexible display, a transparent display, or the like, but is not limited thereto.

The buffer 120 may store data corresponding to a predetermined reproduction section with reference to a current reproduction time of a content in a high-speed temporary memory device which temporarily stores received data and then transmits the data.

Herein, the predetermined reproduction section may be a predetermined time section. For example, when the current reproduction time of the content is 30 minutes and 30 seconds, the buffer 120 may store data corresponding to 30 seconds before or after 30 minutes and 30 seconds. However, this is merely an example and the buffer 120 may store data of other time sections.

The predetermined reproduction section may be determined by a capacity of the buffer. For example, when the current reproduction time of the content is 30 minutes and 30 seconds, the buffer 120 may store data of 1 MB in total before or after 30 minutes and 30 seconds.

The buffer 120 may store only data after the current reproduction time of the content or may store only data before the current reproduction time of the content. For example, when the current reproduction time of the content is 30 minutes and 30 seconds, the buffer 120 may store only data of a predetermined reproduction section after 30 minutes and 30 seconds, or may store only data of a predetermined reproduction section before 30 minutes and 30 seconds.

The buffer 120 may store data of a content which is demultiplexed and decoded serially. To reproduce a content, demultiplexing and decoding processes are required, and a detailed description thereof is omitted since it falls out of the scope of the present disclosure. When the display apparatus 100 uses the demultiplexed and decoded data which is stored in the buffer 120, the display apparatus 100 may display the content more swiftly than when it uses data stored in other storage media (for example, an HDD, an SDD, an RAM, or the like) since the data has been completely demultiplexed and decoded.

However, this should not be considered as limiting. The buffer 120 may store data which is not demultiplexed and decoded. Accordingly, when the display apparatus 100 uses data which is stored in the buffer 120 without being demultiplexed and decoded, the data goes through the demultiplexing and decoding processes. However, when the display apparatus 100 uses data which is stored in the buffer 120 without being demultiplexed and decoded, the display apparatus 100 may display the content more swiftly than when it uses data stored in other storage media since the buffer 120 is normally faster than normal storage media.

The processor 120 may include various processing circuitry and control an overall operation of the display apparatus 100.

In response to a command to display a specific reproduction time of a content being received, the processor 130 may determine a reproduction position of the content corresponding to the specific reproduction time based on a position corresponding to a predetermined reproduction section based on a position relationship between the specific reproduction time and a current reproduction time, or may determine a reproduction position of the content corresponding to the specific reproduction time based on at least one of a start portion and an end position of the content.

For example, in response to a current reproduction time of a content being 30 minutes and 30 seconds and a command to reproduce from 31 minutes being received, the processor 130 may determine a reproduction position of the content corresponding to 31 minutes of the current reproduction time of 30 minutes and 30 seconds according to a position relationship between the specific reproduction time and the current reproduction time. However, the determined reproduction position of the content may not be exactly 31 minutes, and this will be described below in greater detail.

The processor 130 may determine the reproduction position of the content corresponding to the specific reproduction time based on: a time variation which is calculated based on time information corresponding to the start position and the end position of the predetermined reproduction section; and a position variation which is calculated based on position information corresponding to the start position and the end position of the predetermined reproduction section. Alternatively, the processor 130 may determine the reproduction position of the content corresponding to the specific reproduction time based on: a time variation which is calculated based on time information corresponding to one of the start position and the end position of the content and the current reproduction time; and a position variation which is calculated based on position information corresponding to one of the start position and the end position of the content and the current reproduction time.

Herein, the time information may be information regarding the specific reproduction time in the total reproduction section of the content, and the position information may be information regarding a portion corresponding to the specific reproduction time in the total capacity of the content.

For example, the time information may be 1 hour, 10 minutes, and 5 seconds, and the position information may be expressed by a capacity such as 354 MB. A detailed description thereof will be provided below.

In response to a position difference between a reproduction position corresponding to the specific reproduction time and a reproduction position corresponding to the current reproduction time being less than or equal to a predetermined value, the processor 130 may determine the reproduction position of the content corresponding to the specific reproduction time based on the start position and the end position of the predetermined reproduction section, and, in response to the position difference exceeding the predetermined value, the processor 130 may determine the reproduction position of the content corresponding to the specific reproduction time based on at least one of the start position and the end position of the content.

Herein, the processor 130 may determine the size of the predetermined value based on the size of the buffer 120. For example, the size of the predetermined value may be a predetermined multiple of the capacity of the buffer 120. However, this should not be considered as limiting. The size of the predetermined value may have a different value. For example, the processor 130 may learn to reduce an error in the determined reproduction position of the content and may determine the size of the predetermined value.

In response to the content being a streaming content and the position difference exceeding the predetermined value, the processor 130 may determine the reproduction position of the content corresponding to the specific reproduction time based on the start position of the content and the current reproduction time.

Alternatively, in response to the content being a pre-stored content and the position difference exceeding the predetermined value, and in response to the specific reproduction time being before the current reproduction time, the processor 130 may determine the reproduction position of the content corresponding to the specific reproduction time based on the start position of the content and the current reproduction time, and, in response to the specific reproduction time being after the current reproduction time, the processor 130 may determine the reproduction position of the content corresponding to the specific reproduction time based on the end position of the content and the present reproduction time.

In addition, in response to the position difference being less than or equal to the predetermined value, the processor 130 may determine the reproduction position of the content corresponding to the specific reproduction time based on: a time variation which is calculated based on time stamps corresponding to the start position and the end position of the predetermined reproduction section; and a position variation which is calculated based on reproduction positions corresponding to the start position and the end position of the predetermined reproduction section. Herein, a method of determining the reproduction position of the content using the time stamps and the reproduction positions will be described in detail below.

In response to the position difference exceeding the predetermined value, the processor 130 may determine the reproduction position of the content corresponding to the specific reproduction time based on a time variation which is calculated based on time stamps corresponding to the start position of the content and the current reproduction time; and a position variation which is calculated based on reproduction positions corresponding to the start position of the content and the current reproduction time.

In response to the content being a pre-stored 3D content, the processor 130 may determine the reproduction position of the content corresponding to the specific reproduction time based on the start position and the end position of the content.

Figure 1B:
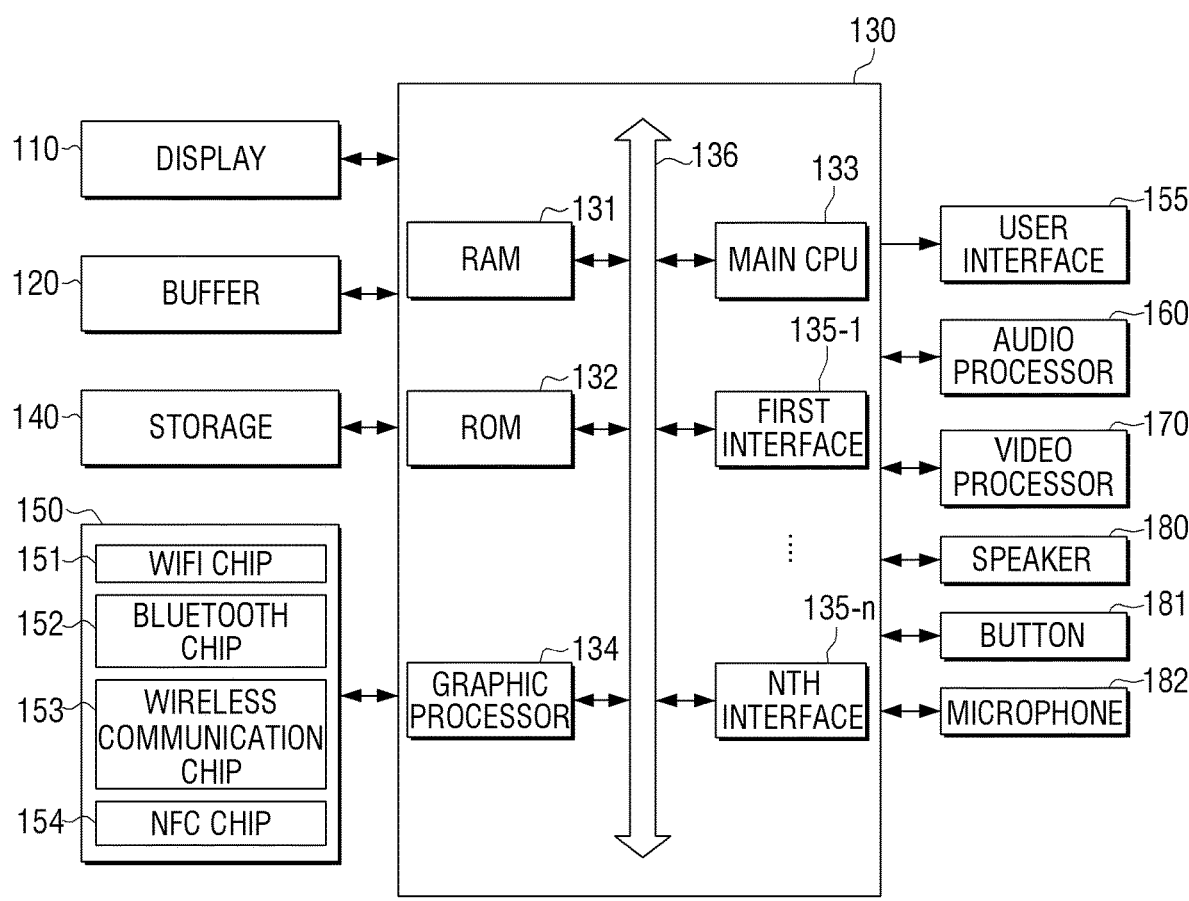
FIG. 1B is a block diagram illustrating an example configuration of the display apparatus 100 according to an example embodiment.

FIG. 1B is a block diagram illustrating an example configuration of the display apparatus 100. Referring to FIG. 1B, the display apparatus 100 may include a display 110, a buffer 120, a processor (e.g., including processing circuitry) 130, a storage 140, a communication unit (e.g., including communication circuitry) 150, a user interface (e.g., including interface circuitry) 155, an audio processor 160, a video processor 170, a speaker 190, a button 181, and a microphone 182. From among the elements illustrated in FIG. 1B, the same elements as those in FIG. 1A may not be described in detail.

The processor 130 may include various processing circuitry and control an overall operation of the display apparatus 100 using various programs stored in the storage 140.

Specifically, the processor 130 may include a random access memory (RAM) 131, a read only memory (ROM) 132, a main central processing unit (CPU) 133, a graphic processor 134, first to nth interfaces 135-1 to 135-n, and a bus 136.

The RAM 131, the ROM 132, the main CPU 133, the graphic processor 134, and the first to nth interfaces 135-1 to 135-n may be connected with one another via the bus 136.

The first to nth interfaces 135-1 to 135-n may be connected with the above-described elements. One of the interfaces may be a network interface connected to an external device via a network.

The main CPU 133 may access the storage 140 and performs booting using an operating system (O/S) stored in the storage 140. In addition, the main CPU 133 performs various operations using various programs stored in the storage 140.

The ROM 132 stores a set of commands for booting a system. In response to a turn-on command being inputted and power being supplied, the main CPU 133 copies the 0/S stored in the storage 140 onto the RAM 131 according to the command stored in the ROM 132, executes the O/S and boots the system. In response to booting being completed, the main CPU 133 copies various application programs stored in the storage 140 onto the RAM 131, executes the programs copied onto the RAM 131, and performs various operations.

The graphic processor 134 may generate a screen including various objects such as an icon, an image, a text, and the like, using a calculator (not shown) and a renderer (not shown). The calculator (not shown) calculates attribute values of the objects to be displayed, such as coordinate values, shape, size, color, and the like, according to the layout of the screen based on a received control command. The renderer (not shown) generates a screen of various layouts including the objects based on the attribute values calculated by the calculator. The screen generated by the renderer (not shown) may be displayed on a display region of the display 110.

The above-described operations of the processor 130 may be performed by a program stored in the storage 140.

The storage 140 may store various data such as an O/S software module for driving the display apparatus 100, various contents, a content reproduction position determination module, or the like.

In this case, the processor 130 may determine a reproduction position of a content based on information stored in the storage 140, and may display the content from the determined reproduction position.

The communication unit 150 may include various processing circuitry and is configured to communicate with various kinds of external devices in various communication methods. The communication unit 150 may include various communication circuitry, such as, for example, and without limitation, a WiFi chip 151, a Bluetooth chip 152, a wireless communication chip 153, a Near Field Communication (NFC) chip 154, or the like. The processor 130 may communicate with various kinds of external devices using the communication unit 150.

The WiFi chip 151 and the Bluetooth chip 152 communicate in a WiFi method and a Bluetooth method, respectively. When the WiFi chip 151 or the Bluetooth chip 152 is used, a variety of connection information such as an SSID and a session key may be exchanged first, and communication may be established using the connection information, and then a variety of information may be exchanged. The wireless communication chip 153 refers to a chip which communicates according to various communication standards such as IEEE, Zigbee, $3^{rd}$ Generation (3G), $3^{rd}$ Generation Partnership Project (3GPP), Long Term Evolution (LTE), and the like. The NFC chip 154 refers to a chip which operates in an NFC method using a band of 13.56 MHz from among various RF-ID frequency bands such as 135 kHz, 13.56 MHz, 433 MHz, 860-960 MHz, and 2.45 GHz.

The communication unit 150 may perform unidirectional communication or bidirectional communication with an external device. When performing the unidirectional communication, the communication unit 150 may receive signals from the external device. When performing the bidirectional communication, the communication unit 150 may receive signals from the external device and may transmit signals to the external device.

The user interface 155 may include various interface circuitry and receive various user interactions. Herein, the user interface 155 may be implemented in various forms according to an implementation example of the display apparatus 100. When the display apparatus 100 is implemented by using a digital TV, the user interface 155 may be implemented, for example, and without limitation, using a remote control receiver for receiving a remote control signal from a remote controller, a camera for sensing a user motion, a microphone for receiving a user voice, or the like. In addition, when the display apparatus 100 is implemented by using a touch-based electronic device, the user interface 155 may be implemented by using a touch screen forming an interlayered structure with a touch pad. In this case, the user interface 155 may be used as the above-described display 110.

The audio processor 160 is an element for processing audio data. The audio processor 160 may perform various processing operations such as decoding, amplifying, noise filtering, or the like with respect to the audio data.

The video processor 170 is an element for processing video data. The video processor 170 may perform various image processing operations such as decoding, scaling, noise filtering, frame rate conversion, resolution conversion, or the like with respect to the video data.

The speaker 180 is an element which outputs various notification sounds or voice messages as well as various audio data processed in the audio processor 160.

The button 181 may be various types of buttons formed on a certain area of an exterior of a main body of the display apparatus 100, such as a front surface, a side surface, a rear surface, or like, for example, a mechanical button, a touch pad, a wheel, or the like.

The microphone 183 is configured to receive a user voice or other sounds and convert them into audio data.

Hereinafter, a basic configuration for ease of understanding of the present disclosure and various example embodiments will be described.

Figure 2A:
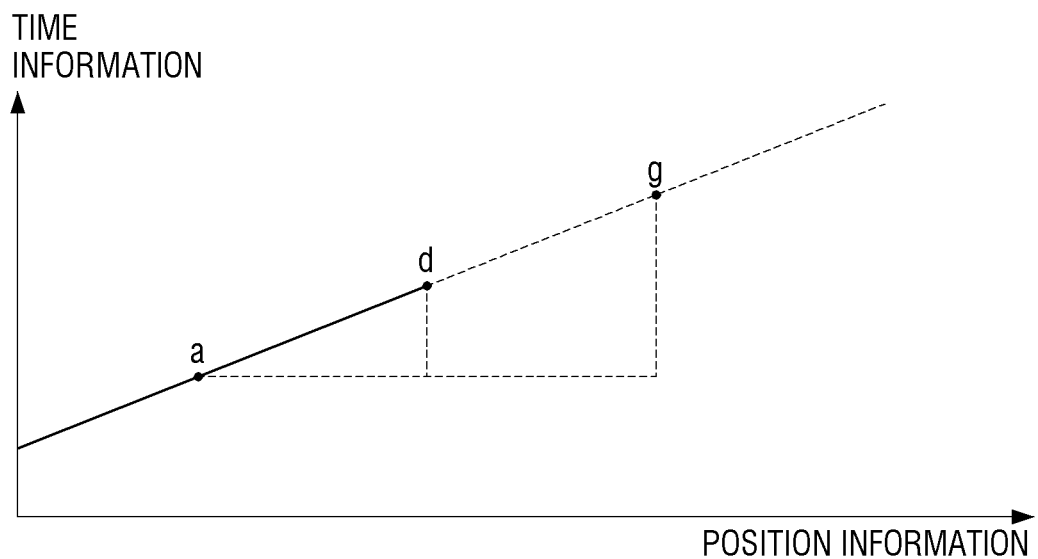
FIGS. 2A and 2B are diagrams illustrating an example of a relationship between time information and position information of a content.
Figure 2B:
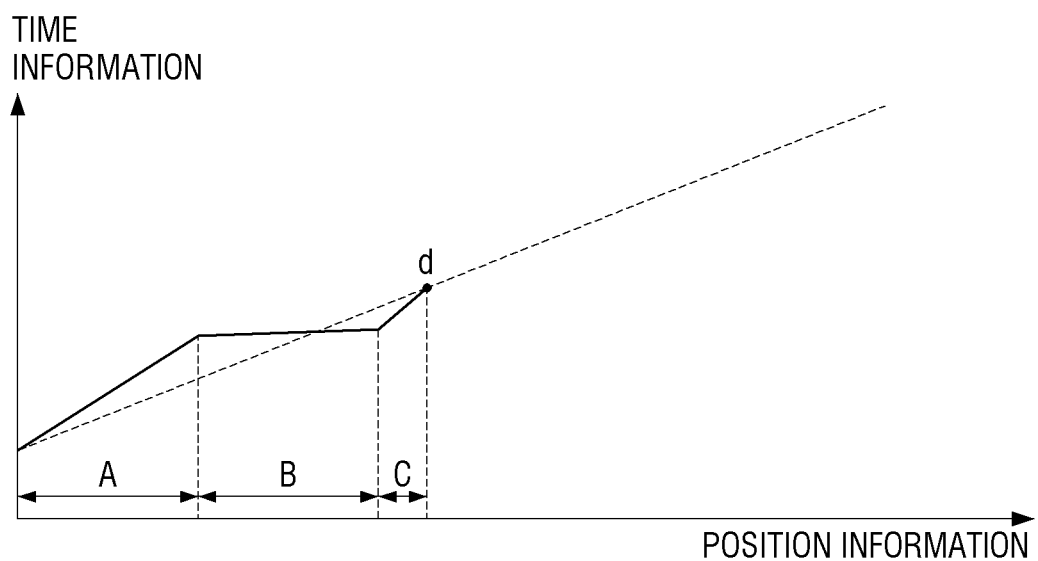

FIGS. 2A and 2B are diagrams illustrating an example relationship between time information and position information of a content.

Contents may be divided into a content including index information and a content not including index information. Herein, the index information may be information regarding a relationship between time information and position information of the content.

The content including the index information may store index information in a header, and a relationship between time information and position information of the content may be used to display a specific reproduction time of the content. For example, in response to a command to display a content including index information from 31 minutes and 35 seconds being received, the processor 130 may extract position information corresponding to 31 minutes and 35 seconds from the index, and may display the content based on the extracted position information.

Since the content not including the index information does not store the relationship between the time information and the position information of the content, other methods may be required to display a specific reproduction time of the content. The present disclosure relates to reproducing a content not including index information from a specific reproduction time.

However, this should not be considered as limiting. The present disclosure may be applied to a content including index information. For example, when an error occurs in a header storing index information or index information stored in the header is insufficient, the present disclosure may be applied to the content including the index information.

FIG. 2A is a view illustrating an example of an ideal relationship between time information and position information of a content. The x-axis indicates position information and the Y-axis indicates time information. In FIG. 2A, a current reproduction time is expressed by d, a specific reproduction time is expressed by g, a reproduced section is expressed by a solid line, and a section that is not reproduced is expressed by a dashed line. The display apparatus 100 may calculate time information and position information of the current reproduction time d during a display process, but information that has been already displayed before time d is deleted and a time may be required to calculate time information and position information before time d. Alternatively, time information and position information of predetermined some points of time may be calculated during a parsing process. For example, in response to a content being parsed, time information and position information corresponding to a start position and an end position of the content may be calculated.

Herein, the time information may refer to a reproduction time of the content, and the position information may refer to a reproduction position of the content. For example, the total reproduction time of the content may be 100 minutes and the total capacity of the content may be 1 GB. In this case, the time information of the content may refer to a specific reproduction time out of 100 minutes, and the position information of the content may refer to a specific reproduction position out of 1 GB.

That is, in response to the time information of the content being 10 minutes, the position information of the content may be a position corresponding to 100 MB. In addition, in response to the time information of the content being 50 minutes, the position information of the content may be a position corresponding to 500 MB. Accordingly, in the case of the ideal relationship as shown in FIG. 2A, to display a specific reproduction time of the content, an exact reproduction position may be determined using the proportional relationship between the time information and the position information of the content.

In this case, to use the proportional relationship, time information and position information of a certain point of time other than time d may be required. In response to information of time a being stored, time information and position information of time a being (Aa, Ba), time information and position information of time d being (Ad, Bd), and time information of a specific reproduction time being Ag, position information Bg of the specific reproduction time may be calculated based on the following proportional expression:

$$(Ad-Aa):(Ag-Aa)=(Bd-Ba):(Bg-Ba)$$

FIG. 2B is a illustrating an example of a non-ideal relationship between time information and position information of a content.

As shown in FIG. 2B, the relationship between the time information and the position information of the content may not be ideal. An A section and a C section may be sections in which a capacity for storing the same time section is smaller than an average, and a B section may be a section in which the capacity for storing the same time section is greater than the average. That is, in the A section and the C section, more reproduction time sections may be stored with the same capacity, and in the B section, relatively small reproduction time sections may be stored with the same capacity.

In response to position information of a specific reproduction time being determined using the proportional expression of FIG. 2A, but the relationship between the time information and the position information of the content not being ideal, an error may occur. However, the error may be minimized using the regularity of each of the A section, the B section, and the C section. This will be described in greater detail below with reference to the drawings.

Figure 3:
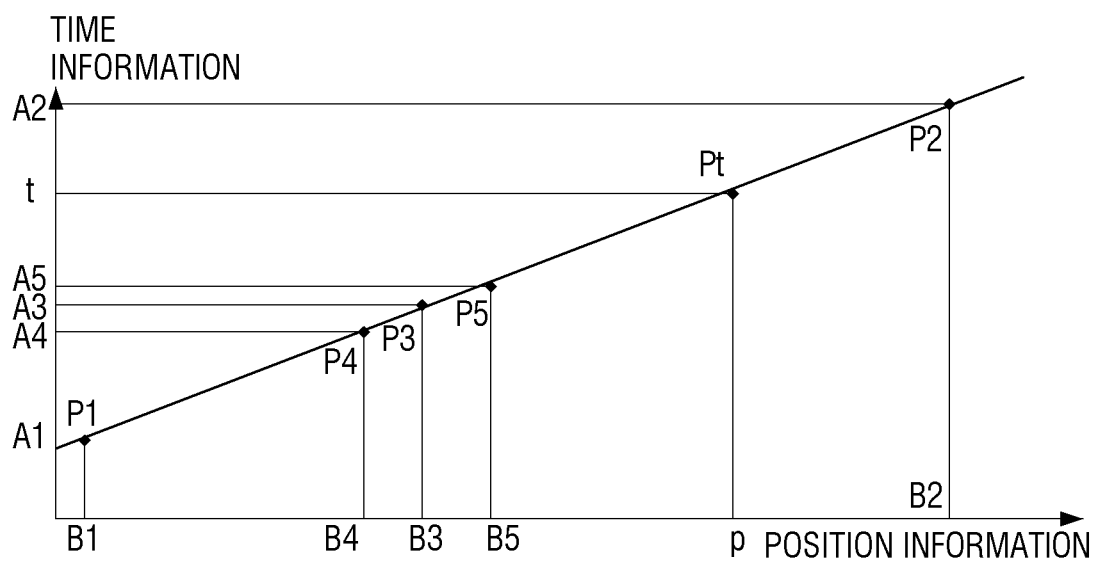
FIG. 3 is a diagram illustrating an example method for determining a reproduction position according to an example embodiment.

FIG. 3 is a diagram illustrating an example method of determining a reproduction position according to an example embodiment.

As illustrated in FIG. 3, in response to a command to display a specific reproduction time Pt of a content being received, the processor 130 may determine a reproduction position of the content corresponding to the specific reproduction time Pt based on a position corresponding to a predetermined reproduction section (P4-P5) based on a position relationship between the specific reproduction time Pt and a current reproduction time P3, or may determine the reproduction position of the content corresponding to the specific reproduction time Pt based on at least one of a start position P1 and an end position P2 of the content.

Herein, the predetermined reproduction section P4-P5 may refer to a certain section of the content stored in the buffer 120 and is illustrated as a section from P4 to P5. The predetermined reproduction section P4-P5 may include the current reproduction time P3.

The processor 130 may determine the reproduction position of the content corresponding to the specific reproduction time Pt based on a time variation which is calculated based on time information corresponding to the start position P4 and the end position P5 of the predetermined reproduction section P4-P5, and a position variation which is calculated based on position information corresponding to the start position P4 and the end position P5 of the predetermined reproduction section P4-P5. As illustrated in FIG. 2A, the processor 130 may determine the reproduction position of the content corresponding to the specific reproduction time Pt using the following proportional expression as long as the information on the two points is provided:

$$(A5-A4):(t-A4)=(B5-B4):(p-B4)$$

As described above, the processor 130 may calculate the time information and the position information of P4 and P5. In this case, since P4 and P5 are stored in the buffer 120, the processor 130 may calculate the time information and the position information of P4 and P5 more swiftly than when information is stored in a storage medium such as an HDD.

However, this should not be considered as limiting. The processor 130 may determine the reproduction position of the content corresponding to the specific reproduction time Pt using positions other than the start position P4 and the end position P5 of the predetermined reproduction section P4-P5. For example, the processor 130 may determine the reproduction position of the content corresponding to the specific reproduction time Pt using the current reproduction time P3 and another position.

The processor 130 may determine the reproduction position of the content corresponding to the specific reproduction time Pt based on a time variation which is calculated based on time information corresponding to one of the start position P1 and the end position P2 of the content, and the current reproduction time P3, and a position variation which is calculated based on position information corresponding to one of the start position P1 and the end position P2 of the content, and the current reproduction time P3. As described above, the processor 130 may determine the reproduction position of the content corresponding to the specific reproduction Pt using the proportional expression as long as the information on the two points is provided.

For example, when the start position P1 of the content and the current reproduction time P3 are used, the processor 130 may determine the reproduction position of the content corresponding to the specific reproduction time Pt using the following proportional expression:

$$(A3-A1):(t-A1)=(B3-B1):(p-B1)$$

As described above, the processor 130 may calculate the time information and the position information corresponding to the start position P1 and the end position P2 of the content during a parsing process of the content. The calculated information may be stored in the RAM while the content is being displayed. Accordingly, the processor 130 may calculate the time information and the position information corresponding to the start position P1 and the end position P2 of the content without performing a separate process (for example, demultiplexing or the like) to calculate the corresponding information.

However, this should not be considered as limiting. The processor 130 may determine the reproduction position of the content corresponding to the specific reproduction time Pt using one of the start position P1 and the end position P2 of the content and a position other than the current reproduction time P3. For example, the processor 130 may determine the reproduction position of the content corresponding to the specific reproduction time Pt using the start position P1 and the end position P2 of the content.

To determine the reproduction position of the content corresponding to the specific reproduction time Pt, the processor 130 may determine whether two points of the total reproduction section of the content or two points of the predetermined reproduction section P4-P5 are used according to a position relationship between the specific reproduction time Pt and the current reproduction time P3. This will be described in FIG. 4 in detail.

Figure 4:
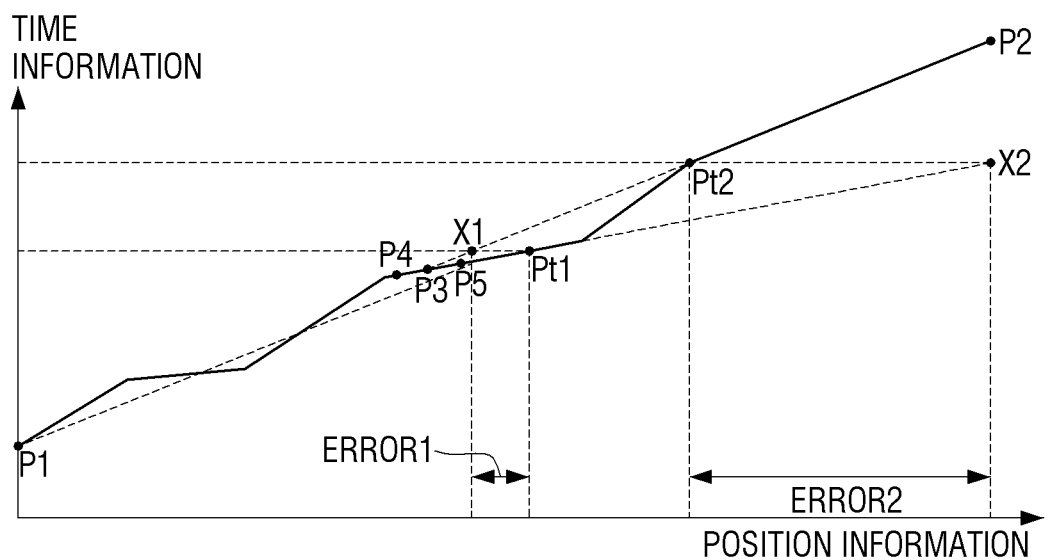
FIG. 4 is a diagram illustrating an example operation according to a position relationship between a specific reproduction time and a current reproduction time according to an example embodiment.

FIG. 4 is a diagram illustrating an example operation according to a position relationship between a specific reproduction time Pt and a current reproduction time P3 according to an example embodiment.

As illustrated in FIG. 4, in response to a position difference between a reproduction position corresponding to the specific reproduction time and a reproduction position corresponding to the current reproduction time P3 being less than or equal to a predetermined value, the processor 130 may determine a reproduction position of the content corresponding to the specific reproduction time based on a start position P4 and an end position P5 of a predetermined reproduction section P4-P5.

For example, in response to a position difference between a reproduction position corresponding to a first specific reproduction time Pt1 and the reproduction position corresponding to the current reproduction time P3 being less than or equal to the predetermined value, the processor 130 may determine the reproduction position of the content corresponding to the first specific reproduction time Pt1 based on the start position P4 and the end position P5 of the predetermined reproduction section P4-P5.

Herein, the processor 130 may determine the size of the predetermined value based on the size of the buffer 120. For example, when the size of the buffer 120 is 1 MB, the size of the predetermined value may be a value that can be stored in 1 MB. Alternatively, the size of the predetermined value may be determined as a multiple of the size of the buffer 120.

In response to the reproduction position of the content corresponding to the first specific reproduction time Pt1 being determined based on two points of the total section of the content rather than the start position P4 and the end position P5 of the predetermined reproduction section P4-P5 although the above-described position difference is less than or equal to the predetermined value, an error may increase.

For example, in response to the processor 130 determining the reproduction position of the content corresponding to the first specific reproduction time Pt1 based on the current reproduction time P3 and an end position P2 of the content, the determined position may be X1 and error 1 may occur.

In particular, in response to the position difference being less than or equal to the predetermined value, the processor 130 may determine the reproduction position of the content corresponding to the first specific reproduction time Pt1 based on a time variation which is calculated based on time stamps corresponding to the start position P4 and the end position P5 of the predetermined reproduction sections P4-P5, and a position variation which is calculated based on the reproduction positions corresponding to the start position P4 and the end position P5 of the predetermined reproduction section P4-P5.

Herein, the time stamp may be time information changed to a unit that can be recognized by the display apparatus 100. The reproduction position may be position information changed to a unit that can be recognized by the display apparatus 100, and may be referred to as a physical sector number (PSN), a bytes unit, or a byte position.

Although the processor 130 uses the time stamp and the reproduction position, the same result may be obtained since the proportional expression is used and the reproduction position of the content corresponding to the specific reproduction time is determined and then units are inversely changed. A configuration of the display apparatus 100 for an actual calculation is out of the scope of the present disclosure and thus a detailed description thereof is omitted.

On the other hand, in response to the position difference exceeding the predetermined value, the processor 130 may determine the reproduction position of the content corresponding to the specific reproduction time Pt based on at least one of the start position P1 and the end position P2 of the content.

For example, in response to a position difference between a reproduction position corresponding to a second specific reproduction time Pt2 and a reproduction position corresponding to the current reproduction time P3 exceeding the predetermined value, the processor 130 may determine the reproduction position of the content corresponding to the second specific reproduction time Pt2 based on at least one of the start position P1 and the end position P2 of the content.

In response to the reproduction position of the content corresponding to the second specific reproduction time Pt2 being determined based on two points of the predetermined reproduction section P4-P5 rather than at least one of the start position P1 and the end position P2 of the content although the above-described position difference exceeds the predetermined value, an error may increase.

For example, in response to the processor 130 determining the reproduction position of the content corresponding to the second specific reproduction time Pt2 based on the start position P4 and the end position P5 of the predetermined reproduction section P4-P5, the determined position may be X2 and error 2 may occur.

In particular, in response to the position difference exceeding the predetermined value, the processor 130 may determine the reproduction position of the content corresponding to the second specific reproduction time Pt2 based on a time variation which is calculated based on time stamps corresponding to the start position P1 of the content and the current reproduction time P3, and a position variation which is calculated based on the reproduction positions corresponding to the start position P1 of the content and the current reproduction time P3.

As illustrated in FIG. 4, the relationship between the time information and the position information of the content may be partially proportional. Accordingly, as the difference between the current reproduction time and the specific reproduction time decreases, a probability that the proportional relationship is maintained may increase, and the error may be reduced using two close points. Alternatively, as the difference between the current reproduction time and the specific reproduction time increases, the probability that the proportional relationship is maintained may decrease, and the error may be reduced by using an average value of the total section.

Although the predetermined value is illustrated as a fixed value in FIG. 4, this should not be considered as limiting. For example, the predetermined value may be changed according to the position of the current reproduction time P3. Alternatively, the predetermined value may be changed based on a position of a specific reproduction time in addition to the current reproduction time P3. That is, the processor 130 may determine the predetermined value based on at least one of the size of the buffer 120, the position of the current reproduction time P3, and the position of the specific reproduction time.

Figure 5:
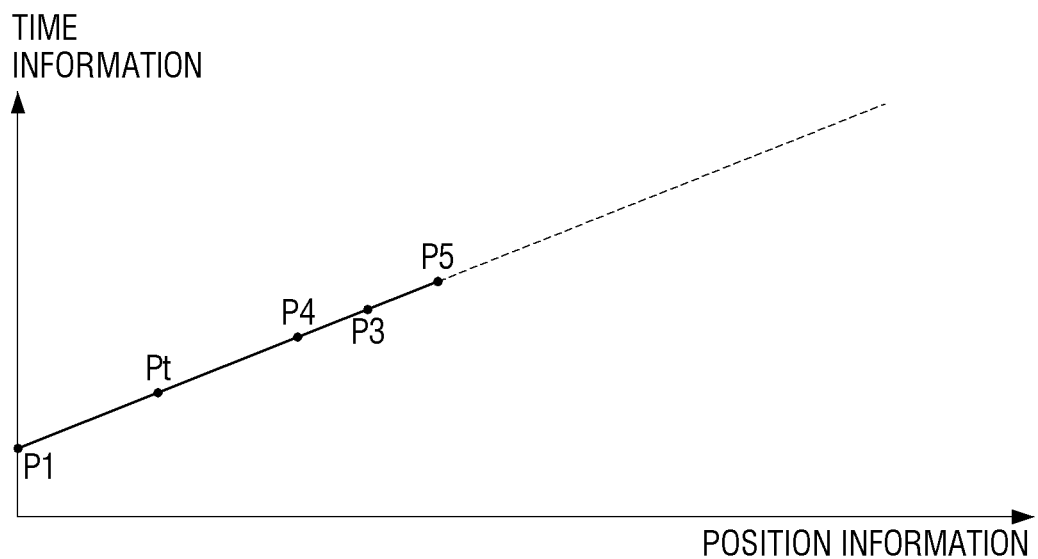
FIG. 5 is a diagram illustrating an example in which a streaming content is displayed according to an example embodiment.

FIG. 5 is a diagram illustrating an example in which a streaming content is displayed according to an example embodiment.

As illustrated in FIG. 5, in response to the content being a streaming content and a position difference between a reproduction position corresponding to a specific reproduction time Pt and a reproduction position corresponding to a current reproduction time P3 exceeding a predetermined value, the processor 130 may determine a reproduction position of the content corresponding to the specific reproduction time Pt based on a start position P1 of the content and the current reproduction time P3.

In the case of a streaming content, there may be no information regarding an end position of the content. Accordingly, in response to the position difference exceeding the predetermined value, the processor 130 may determine the reproduction position of the content corresponding to the specific reproduction time Pt based on the start position P1 of the content and the current reproduction time P3.

However, in response to the position difference being less than or equal to the predetermined value, the processor 130 may determine the reproduction position of the content corresponding to the specific reproduction time Pt based on a start position P4 and an end position P5 of a predetermined reproduction section P4-P5.

Figure 6:
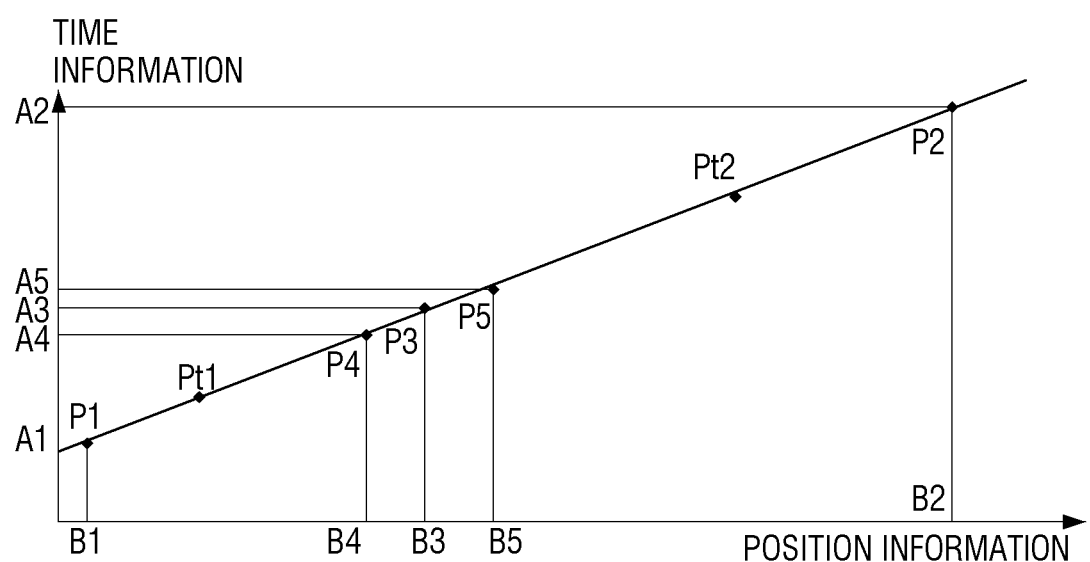
FIG. 6 is a diagram illustrating an example in which a pre-stored content is displayed according to an example embodiment.

FIG. 6 is a diagram illustrating an example in which a pre-stored content is displayed according to an example embodiment.

As illustrated in FIG. 6, in response to the content being a pre-stored content and a position difference between a reproduction position corresponding to a first specific reproduction time Pt1 and a reproduction position corresponding to a current reproduction time P3 exceeding a predetermined value, and, in response to the first specific reproduction time Pt1 being before the current reproduction time P3, the processor 130 may determine a reproduction position of the content corresponding to the first specific reproduction time Pt1 based on a start position P1 of the content and the current reproduction time P3.

Alternatively, in response to the content being a pre-stored content and a position difference between a reproduction position corresponding to a second specific reproduction time Pt2 and a reproduction position corresponding to the current reproduction time P3 exceeding the predetermined value, and, in response to the second specific reproduction time Pt2 being after the current reproduction time P3, the processor 130 may determine a reproduction position of the content corresponding to the second specific reproduction time Pt2 based on an end position P2 of the content and the current reproduction time P3.

However, in response to a position difference between a reproduction position corresponding to a specific reproduction time and the reproduction position corresponding to the current reproduction time P3 being less than or equal to the predetermined value, the processor 130 may determine a reproduction position of the content corresponding to the specific reproduction time based on a start position P4 and an end position P5 of a predetermined reproduction section P4-P5.

As illustrated in FIGS. 5 and 6, the processor 130 may change the method of determining a reproduction position of a content corresponding to a specific reproduction time according to the method of receiving the content.

Figure 7:
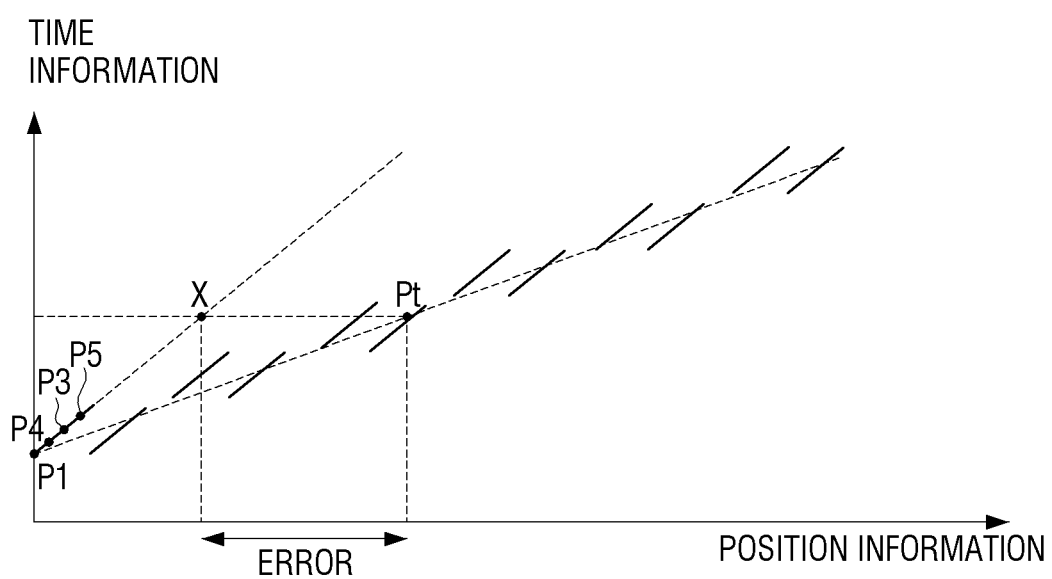
FIG. 7 is a diagram illustrating an example in which a 3D content is displayed according to an example embodiment.

FIG. 7 is a diagram illustrating an example in which a 3D content is displayed according to an example embodiment.

The 3D content may be formed of a pair of images to display one frame like a left-right image or a top-bottom image. Accordingly, as shown in FIG. 7, in the case of a 3D content, a pair of parallel lines may be illustrated during the same time section.

In response to the content being a pre-stored 3D content, the processor 130 may determine a reproduction position of the content corresponding to a specific reproduction time Pt based on a start position P4 and an end position P5 of the content.

In response to the processor 130 determining the reproduction position of the content corresponding to the specific reproduction time Pt based on the start position P4 and the end position P5 of the predetermined reproduction section P4-P5, the determined position may be X and an error may occur.

On the other hand, in response to the content being a streaming 3D content, the processor 130 may determine a reproduction position of the content based on the start position P4 of the content and the current reproduction time P3.

As illustrated in FIGS. 5, 6, and 7, the processor 130 may change the method of determining a reproduction position of a content corresponding to a specific reproduction time according to the type of the content.

Figure 8:
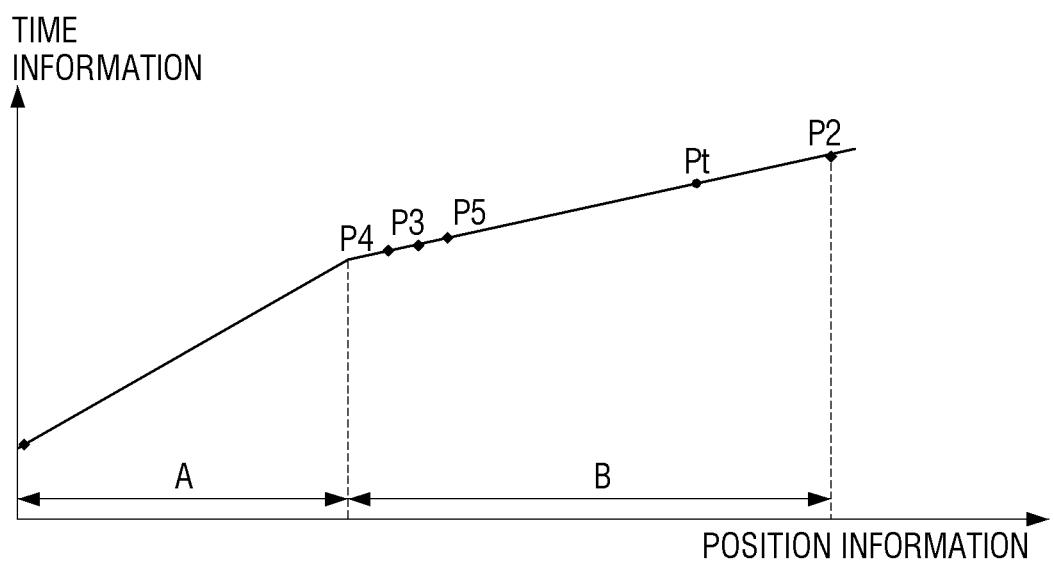
FIG. 8 is a diagram illustrating an example method of using learning according to an example embodiment.

FIG. 8 is a diagram illustrating an example method of using learning according to an example embodiment.

The processor 130 may extract a trend between time information and position information of each content every time the content is displayed. FIG. 8 illustrates an example of the trend between the time information and the position information of the content.

For example, as a result of analyzing a trend of time information and position information of a plurality of contents, the processor 130 may extract a trend indicating that a slope of the time information and the position information is changed once at a specific ratio in the total section of the content.

Accordingly, the processor 130 may determine a reproduction position of the content corresponding to a specific reproduction time Pt according to a position of a current reproduction time P3, a position of the specific reproduction time Pt, and the extracted trend.

For example, in response to the position of the current reproduction time P3 and the position of the specific reproduction time Pt being positioned in a B section, the processor 130 may determine the reproduction position of the content corresponding to the specific reproduction time Pt based on the current reproduction time P3 and an end position P2 of the content. Alternatively, in response to a predetermined reproduction section P4-P5 being positioned in the B section, the processor 130 may determine the reproduction position of the content corresponding to the specific reproduction time Pt based on the start position P4 and the end position P5 of the predetermined reproduction section P4-P5. In this case, the processor 130 may consider whether a position difference between a reproduction position corresponding to the specific reproduction time Pt and a reproduction position corresponding to the current reproduction time P3 is less than or equal to a predetermined value, and this has been described above and thus a detailed description thereof is omitted.

Even in response to the position difference between the reproduction position corresponding to the specific reproduction time Pt and the reproduction position corresponding to the current reproduction time P3 being less than or equal to the predetermined value, the processor 130 may determine the reproduction position of the content corresponding to the specific reproduction time Pt based on the current reproduction time P3 and the end position P2 of the content. For example, in response to the start position P4 of the predetermined reproduction section P4-P5 being positioned in an A section, the processor 130 may determine the reproduction position of the content corresponding to the specific reproduction time Pt based on the current reproduction time P3 and the end position P2 of the content.

Even in response to the position difference between the reproduction position corresponding to the specific reproduction time Pt and the reproduction position corresponding to the current reproduction time P3 exceeding the predetermined value, the processor 130 may determine the reproduction position of the content corresponding to the specific reproduction time Pt based on the start position P4 and the end position P5 of the predetermined reproduction section P4-P5. For example, in response to the content being a streaming content, there may be no information regarding the end position P2 of the content, and, in response to the specific reproduction time Pt, and the start position P4 and the end position P5 of the predetermined reproduction section P4-P5 being positioned in the B section, the processor 130 may determine the reproduction position of the content corresponding to the specific reproduction time Pt based on the start position P4 and the end position P5 of the predetermined reproduction section P4-P5.

FIG. 9 is a flowchart illustrating an example content display method of a display apparatus according to an example embodiment.

A content is displayed (S9101). In addition, data corresponding to a predetermined reproduction section with reference to a current reproduction time of the content is stored in a buffer (S920). In addition, in response to a command to display a specific reproduction time of the content being received, a reproduction position of the content corresponding the specific reproduction time may be determined based on a position corresponding to the predetermined reproduction section based on a position relationship between the specific reproduction time and the current reproduction time, or the reproduction position of the content corresponding to the specific reproduction time may be determined based on at least one of a start position and an end position of the content (S930).

The step of determining (S930) may include: determining the reproduction position of the content corresponding to the specific reproduction time based on a time variation which is calculated based on time information corresponding to a start position and an end position of the predetermined reproduction section, and a position variation which is calculated based on position information corresponding to the start position and the end position of the predetermined reproduction section; or determining the reproduction position of the content corresponding to the specific reproduction time based on a time variation which is calculated based on time information corresponding to one of the start position and the end position of the content and the current reproduction time, and a position variation which is calculated based on position information corresponding to one of the start position and the end position of the content and the current reproduction time.

The step of determining (S930) may include: in response to a position difference between a reproduction position corresponding to the specific reproduction time and a reproduction position corresponding to the current reproduction time being less than or equal to a predetermined value, determining the reproduction position of the content corresponding to the specific reproduction time based on a start position and an end position of the predetermined reproduction section, and, in response to the position difference exceeding the predetermined value, determining the reproduction position of the content corresponding to the specific reproduction time based on at least one of the start position and the end position of the content.

Herein, a size of the predetermined value may be determined based on a size of the buffer.

The step of determining (S930) may include: in response to the content being a streaming content and the position difference exceeding the predetermined value, determining the reproduction position of the content corresponding to the specific reproduction time based on the start position of the content and the current reproduction time.

The step of determining (S930) may include: in response to the content being a pre-stored content and the position difference exceeding the predetermined value, and, in response to the specific reproduction time being before the current reproduction time, determining the reproduction position of the content corresponding to the specific reproduction time based on the start position of the content and the current reproduction time, and, in response to the specific reproduction time being after the current reproduction time, determining the reproduction position of the content corresponding to the specific reproduction time based on the end position of the content and the current reproduction time.

The step of determining (S930) may include: in response to the position difference being less than or equal to the predetermined value, determining the reproduction position of the content corresponding to the specific reproduction time based on a time variation which is calculated based on time stamps corresponding to the start position and the end position of the predetermined reproduction section, and a position variation which is calculated based on reproduction positions corresponding to the start position and the end position of the predetermined reproduction section.

The step of determining (S930) may include: in response to the position difference exceeding the predetermined value, determining the reproduction position of the content corresponding to the specific reproduction time based on a time variation which is calculated based on time stamps corresponding to the start position of the content and the current reproduction time, and a position variation which is calculated based on reproduction positions corresponding to the start position of the content and the current reproduction time.

The step of determining (S930) may include: in response to the content being a pre-stored 3D content, determining the reproduction position of the content corresponding to the specific reproduction time based on the start position and the end position of the content.

According to various example embodiments described above, the display apparatus may determine a reproduction position of a content corresponding to a specific reproduction time based on a position relationship between the specific reproduction time and a current reproduction time of the content. Accordingly, the display apparatus may determine a reproduction position desired by the user more swiftly and exactly.

In the above-described example, the operation of determining a reproduction position of a content is performed once, but this should not be considered as limiting. For example, a reproduction position of a content is determined, and, in response to a real reproduction time of the determined reproduction position having a difference from a specific reproduction time by more than a predetermined value, the processor may determine the reproduction position of the content corresponding to the specific reproduction time again. In this case, the processor may change a reference position for the proportional expression.

The methods according to various example embodiments may be programmed and stored in various storage media. Accordingly, the methods according to various example embodiments as described above may be implemented in various types of electronic apparatuses executing storage media.

For example, a non-transitory computer readable recording medium which stores a program performing the above-described control method in sequence may be provided.

The non-transitory computer readable recording medium refers to a medium that stores data, and is readable by an apparatus. For example, the above-described various applications or programs may be stored in the non-transitory computer readable recording medium such as a compact disc (CD), a digital versatile disk (DVD), a hard disk, a Blu-ray disk, a universal serial bus (USB), a memory card, a ROM or etc., and may be provided.

While the disclosure has been illustrated and described with reference to various example embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be understood as being included in the present disclosure.

What is claimed is:

1. A display apparatus comprising:
   a display;
   a buffer; and
   a processor configured to:
   reproduce a content on the display,
   store, in the buffer, a section of the content corresponding to a current reproduction time,
   in response to a command to reproduce a specific reproduction time of the content being received, reproduce the content at a reproduction position of the content corresponding to the specific reproduction time determined based on a relation between the specific reproduction time and the current reproduction time,
   wherein the processor is further configured to:
   in response to the relation corresponding to a first relation, determine the reproduction position of the content based on two positions included in the section of the content stored in the buffer, and
   in response to the relation corresponding to a second relation, determine the reproduction position of the content based on two positions from among a start position of the content not in the section of content stored in the buffer, an end position of the content not in the section of content stored in the buffer, and the current reproduction time,
   wherein whether the first relation or the second relation is determined is based on a difference between the specific reproduction time and the current reproduction time.

2. The display apparatus of claim 1, wherein the processor is configured to:
   determine the reproduction position of the content corresponding to the specific reproduction time based on a first reproduction time variation which is determined based on time information corresponding to a start position of the section and an end position of the section, and a first reproduction position variation which is determined based on position information corresponding to the start position of the section and the end position of the section; or determine the reproduction position of the content corresponding to the specific reproduction time based on a second reproduction time variation which is determined based on time information corresponding to one of the start position of the content and the end position of the content and the current reproduction time, and a second reproduction position variation which is determined based on position information corresponding to the one of the start position of the content and the end position of the content and the current reproduction time.

3. The display apparatus of claim 1, wherein, in response to the content being a streaming content and the relation corresponding to the second relation, the processor is configured to determine the reproduction position of the content corresponding to the specific reproduction time based on the start position of the content and the current reproduction time.

4. The display apparatus of claim 1, wherein, in response to the content being a pre-stored content and the relation corresponding to the second relation, and, in response to the specific reproduction time being before the current reproduction time, the processor is configured to determine the reproduction position of the content corresponding to the specific reproduction time based on the start position of the content and the current reproduction time, and, in response to the specific reproduction time being after the current reproduction time, the processor is configured to determine the reproduction position of the content corresponding to the specific reproduction time based on the end position of the content and the current reproduction time.

5. The display apparatus of claim 1, wherein, in response to the relation corresponding to the first relation, the processor is configured to determine the reproduction position of the content corresponding to the specific reproduction time based on a first reproduction time variation which is determined based on time stamps corresponding to the start position of the section and the end position of the section, and a first reproduction position variation which is determined based on reproduction positions corresponding to the start position of the section and the end position of the section.

6. The display apparatus of claim 1, wherein, in response to the relation corresponding to the second relation, the processor is configured to determine the reproduction position of the content corresponding to the specific reproduction time based on a second reproduction time variation which is determined based on time stamps corresponding to the start position of the content and the current reproduction time, and a second reproduction position variation which is determined based on reproduction positions corresponding to the start position of the content and the current reproduction time.

7. The display apparatus of claim 1, wherein, in response to the content being a pre-stored 3D content, the processor is configured to determine the reproduction position of the content corresponding to the specific reproduction time based on the start position of the content and the end position of the content.

8. A content display method of a display apparatus, the method comprising:

reproducing a content;

storing, in a buffer, a section of the content corresponding to a current reproduction time; and in response to a command to reproduce a specific reproduction time of the content being received, reproducing the content at a reproduction position of the content corresponding to the specific reproduction time determined based on a relation between the specific reproduction time and the current reproduction time;

wherein the reproducing the content at the reproduction position of the content comprises:

in response to the relation corresponding to a first relation, determining a reproduction position of the content based on two positions included in the section of the content stored in the buffer, and in response to the relation corresponding to a second relation, determining the reproduction position of the content based on two positions from among a start position of the content not in the section of content stored in the buffer, an end position of the content not in the section of content stored in the buffer, and the current reproduction time, wherein whether the first relation or the second relation is determined to occur is based on a difference between the specific reproduction time and the current reproduction time.

9. The method of claim 8, wherein the determining the reproduction position of the content corresponding to the specific reproduction time comprises:

determining the reproduction position of the content corresponding to the specific reproduction time based on a first reproduction time variation which is determined based on time information corresponding to a start position of the section and an end position of the section, and a first reproduction position variation which is determined based on position information corresponding to the start position of the section and the end position of the section; or determining the reproduction position of the content corresponding to the specific reproduction time based on a second reproduction time variation which is determined based on time information corresponding to one of the start position of the content and the end position of the content and the current reproduction time, and a second reproduction position variation which is determined based on position information corresponding to the one of the start position of the content and the end position of the content and the current reproduction time.

10. The method of claim 8, wherein the determining the reproduction position of the content corresponding to the specific reproduction time comprises: in response to the content being a streaming content and the relation corresponding to the second relation, determining the reproduction position of the content corresponding to the specific reproduction time based on the start position of the content and the current reproduction time.

11. The method of claim 8, wherein the determining the reproduction position of the content corresponding to the specific reproduction time comprises: in response to the content being a pre-stored content and the relation corresponding to the second relation, and, in response to the specific reproduction time being before the current reproduction time, determining the reproduction position of the content corresponding to the specific reproduction time based on the start position of the content and the current reproduction time, and, in response to the specific reproduction time being after the current reproduction time, determining the reproduction position of the content corresponding to the specific reproduction time based on the end position of the content and the current reproduction time.

12. The method of claim 8, wherein the
reproduction position of the content corresponding to the specific reproduction time comprises: in response to the relation corresponding to the first relation, determining the reproduction position of the content corresponding to the specific reproduction time based on a first reproduction time variation which is determined based on time stamps corresponding to the start position of the section and the end position of the section, and a first reproduction position variation which is determined based on reproduction positions corresponding to the start position of the section and the end position of the section.

13. The method of claim 8, wherein the determining the reproduction position of the content corresponding to the specific reproduction time comprises: in response to the relation corresponding to the second relation, determining the reproduction position of the content corresponding to the specific reproduction time based on a second reproduction time variation which is determined based on time stamps corresponding to the start position of the content and the current reproduction time, and a second reproduction position variation which is determined based on reproduction positions corresponding to the start position of the content and the current reproduction time.

14. The method of claim 8, wherein the determining the reproduction position of the content corresponding to the specific reproduction time comprises: in response to the content being a pre-stored 3D content, determining the reproduction position of the content corresponding to the specific reproduction time based on the start position of the content and the end position of the content.

15. A non-transitory computer readable recording medium having stored thereon a program for performing a content display method of a display apparatus, the content display method comprising:
reproducing a content;
storing in a buffer a section of the content corresponding to a current reproduction time; and
in response to a command to reproduce a specific reproduction time of the content being received, reproducing the content at a reproduction position of the content corresponding to the specific reproduction time determined based on a relation between the specific reproduction time and the current reproduction time;
where the reproducing the content at the reproduction position of the content comprises:
in response to the relation corresponding to a first relation, determining a reproduction position of the content based on two positions included in the section of the content stored in the buffer, and
in response to the relation corresponding to a second relation, determining the reproduction position of the content based on two positions from among a start position of the content not in the section of content stored in the buffer, an end position of the content not in the section of content stored in the buffer, and the current reproduction time,
wherein whether the first relation or the second relation is determined to occur is based on a difference between the specific reproduction time and the current reproduction time.

16. The display apparatus of claim 1, wherein in response to reproduction time difference between the specific reproduction time and the current reproduction time being less than or equal to a predetermined value, the processor is configured to determine that the relation corresponds to the first relation, and, in response to the reproduction time difference exceeding the predetermined value, the processor is configured to determine that the relation corresponds to the second relation.

17. The method of claim 8, further comprising: in response to reproduction time difference between the specific reproduction time and the current reproduction time being less than or equal to a predetermined value, determining that the relation corresponds to the first relation, and, in response to the reproduction time difference exceeding the predetermined value, determining that the relation corresponds to the second relation.

* * * * *